(12) United States Patent
Clement et al.

(10) Patent No.: US 12,314,865 B2
(45) Date of Patent: *May 27, 2025

(54) TRANSFER LEARNING SYSTEM FOR AUTOMATED SOFTWARE ENGINEERING TASKS

(71) Applicant: MICROSOFT TECHNOLOGY LICENSING, LLC., Redmond, WA (US)

(72) Inventors: Colin Bruce Clement, Seattle, WA (US); Dawn Drain, San Francisco, CA (US); Neelakantan Sundaresan, Bellevue, WA (US); Alexey Svyatkovskiy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,048

(22) Filed: Jan. 17, 2024

(65) Prior Publication Data

US 2024/0160940 A1 May 16, 2024

Related U.S. Application Data

(63) Continuation of application No. 17/981,440, filed on Nov. 6, 2022, now Pat. No. 11,900,261, which is a
(Continued)

(51) Int. Cl.
*G06N 3/08* (2023.01)
*G06F 8/30* (2018.01)
(Continued)

(52) U.S. Cl.
CPC ............... *G06N 3/088* (2013.01); *G06F 8/30* (2013.01); *G06F 40/40* (2020.01); *G06N 3/045* (2023.01);
(Continued)

(58) Field of Classification Search
CPC .......... G06N 3/088; G06N 3/045; G06N 3/04; G06N 3/063; G06N 3/08; G06N 3/0454;
(Continued)

(56) References Cited

U.S. PATENT DOCUMENTS 8,560,477 B1 * 10/2013 Petrov ................. G06F 18/2323
706/46
2018/0293499 A1 * 10/2018 He .......................... G06F 40/30
(Continued)

OTHER PUBLICATIONS

Aditya Malte et al., Evolution of Transfer Learning in Natural Language Processing, Oct. 16, 2019, [Retrieved on Nov. 27, 2024]. Retrieved from the internet: <URL: https://arxiv.org/pdf/1910.07370> 11 Pages (1-11) (Year: 2019).*
(Continued)

*Primary Examiner* — Anibal Rivera

(57) ABSTRACT

A transfer learning system is used for the development of neural transformer models pertaining to software engineering tasks. The transfer learning system trains source code domain neural transformer models with attention in various configurations on a large corpus of unsupervised training dataset of source code programs and/or source code-related natural language text. A web service provides the trained models for use in developing a model that may be fine-tuned on a supervised training dataset associated with a software engineering task thereby generating a tool to perform the software engineering task.

20 Claims, 8 Drawing Sheets

Related U.S. Application Data continuation of application No. 16/917,267, filed on Jun. 30, 2020, now Pat. No. 11,521,075.

(60) Provisional application No. 63/025,529, filed on May 15, 2020.

(51) Int. Cl.
  *G06F 17/00* (2019.01)
  *G06F 40/40* (2020.01)
  *G06N 3/04* (2023.01)
  *G06N 3/045* (2023.01)
  *G06N 3/088* (2023.01)
  *G06F 8/41* (2018.01)
  *G06F 8/71* (2018.01)
  *G06N 3/063* (2023.01)
  *G06N 20/00* (2019.01)

(52) U.S. Cl.
  CPC .............. *G06F 8/427* (2013.01); *G06F 8/71* (2013.01); *G06N 3/04* (2013.01); *G06N 3/063* (2013.01); *G06N 3/08* (2013.01); *G06N 20/00* (2019.01)

(58) Field of Classification Search
  CPC ...... G06N 3/0445; G06N 20/00; G06F 40/40; G06F 8/30; G06F 8/427; G06F 8/71
  See application file for complete search history.

(56) References Cited

U.S. PATENT DOCUMENTS

2018/0336884 A1* 11/2018 Sriram .................. G06N 3/044
2021/0232873 A1* 7/2021 Kothari .................... G09B 9/00

OTHER PUBLICATIONS

Communication under Rule 164(2)(a) Received in European Patent Application No. 21724124.9, mailed on Nov. 13, 2024, 04 pages.

* cited by examiner

TRANSFER LEARNING SYSTEM FOR AUTOMATED SOFTWARE ENGINEERING TASKS

CROSS-REFERENCE TO RELATED APPLICATIONS

This is a continuation of application Ser. No. 17/981,440 filed on Nov. 6, 2022, entitled "TRANSFER LEARNING SYSTEM FOR AUTOMATED SOFTWARE ENGINEERING TASKS", now U.S. Pat. No. 11,900,261, which is a continuation of application Ser. No. 16/917,267 filed on Jun. 30, 2020, entitled "TRANSFER LEARNING SYSTEM FOR AUTOMATED SOFTWARE ENGINEERING TASKS", now U.S. Pat. No. 11,521,075, which claims the benefit of the earlier filed provisional application having Ser. No. 63/025,529 filed on May 15, 2020, the entireties of all are incorporated by reference.

BACKGROUND

Deep learning neural network models are used often to solve a variety of problems. Neural network models are statistical models that are trained to learn, recognize patterns and make predictions. One drawback of these models is the extensive amount of time and resources that is consumed to train a model. A model may require a training dataset of real-world data consisting of several million data samples which are mined from various sources. The training itself may take days to weeks of computing time and resources. Neural networks are trained iteratively, making multiple passes over the training dataset before converging to a minimum. The training is iterative and the entire training dataset is passed through the neural network in multiple iterations to find the hyperparameters (e.g., model architecture, vocabulary encoding procedures, training objective, data normalization) that meet a target objective. In some instances, the computational expense incurred in training a model limits the amount of training the model receives thereby negatively impacting the final results.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A transfer learning system for automated software engineering tasks provides neural transformer models with attention in various configurations, such as a source code domain encoder neural transformer model, a source code domain decoder neural transformer model, and a source code domain encoder-decoder neural transformer model, and in different model sizes. Each model configuration is trained with a large unsupervised corpus of source code and/or natural language, including code summaries, and the weights and biases learned in the unsupervised training may be fine-tuned for a particular software engineering task.

A software engineering task is an automated activity used to create, develop, maintain, and/or test source code. Source code understanding is needed in a variety of software engineering tasks, such as, without limitation, method completion, documentation/code generation, bug classification, bug patching, and line completion. A software engineering task utilizes the architecture of a particular neural transformer model that aligns best with the task.

In one aspect, the transfer learning system is configured as a web service that contains pre-trained neural transformer models with attention in the various model configurations previously trained to understand source code. The web service fine-tunes a previously-trained neural transformer model on a customer's training dataset in a preferred model and memory size to generate a model that is used as a tool to perform a target software engineering task.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
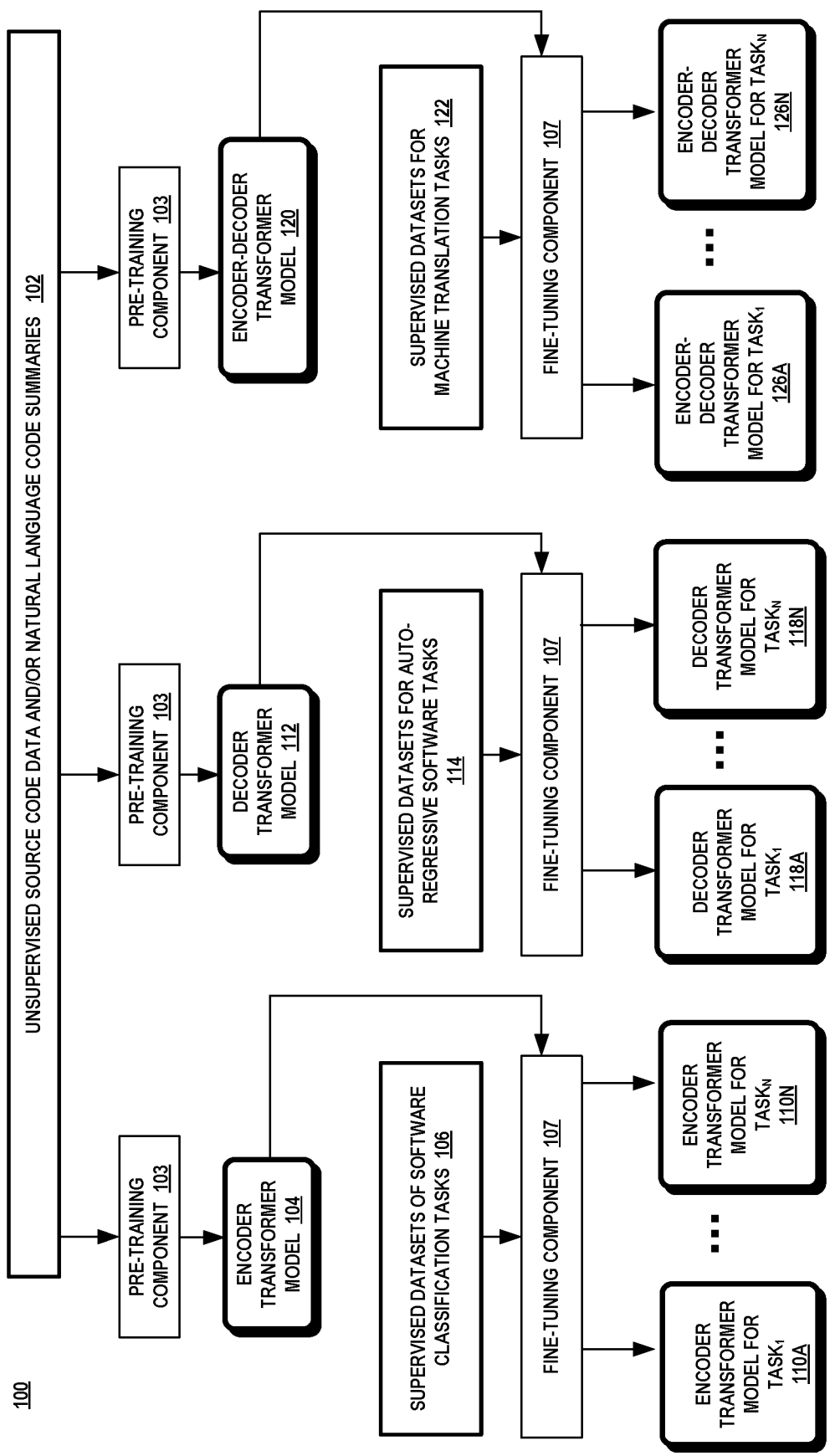
FIG. 1 is a schematic diagram illustrating an exemplary transfer learning system for generating neural transformer models with attention for software engineering tasks.

The subject matter disclosed pertains to a transfer learning system for software engineering tasks. The transfer learning system trains a source code domain neural transformer model with attention with a large corpus of unsupervised training dataset of source code programs and/or source code-related natural language text. The source code domain model is then trained on different supervised training datasets for different automated software engineering tasks. The reuse of the pre-trained neural transformer model with developed weights and biases for source code is a good starting point to develop different models for various software engineering tasks faster and with less computational cost and resources.

A neural transformer model with attention may be constructed in various configurations, such as with encoder-only transformer blocks, decoder-only transformer blocks, or with encoder-decoder blocks. Each model configuration is trained with a large unsupervised corpus of source code and/or natural language code summaries and the weights and biases learned in the unsupervised training may be fine-tuned for a particular software engineering task. A natural language code summary is natural language text that describes a particular portion of source code. The natural language text may be code documentation found in a source code file and/or descriptions of a method or other program elements that can be found in blogs, manuals, or websites.

A software engineering task is an automated activity used to create, develop, maintain, and/or test source code. Source code understanding is needed in a variety of software engineering tasks, such as, without limitation, method completion, documentation/code generation, bug classification, bug patching, code search, and line completion. A software engineering task utilizes the architecture of a particular neural transformer model that aligns best with the task.

Code completion is a tool that attempts to predict the next string of characters that a developer (e.g., user, end-user, programmer, etc.) may type into a source code development tool, such as a source code editor. Source code may consist of various elements (e.g., keywords, delimiters, variables, methods, constants, operators, etc.) that are combined in a particular order in accordance with the grammar of the underlying programming language to form an expression that is used in a program statement. Code completion is used often for method completion to complete a method invocation with a method name or complete a method signature with the method name and parameter list. Code completion may also be configured for line completion which predicts a string of characters to complete a line of code. The line of code is an ordered sequence of program elements, such as, local variables, methods, arguments, keywords, and delimiters that complete an expression or program statement.

Code documentation generation is the task of predicting the contents of a documentation string for a method in the context contained by a corresponding method signature and optionally, the method body corresponding to the method signature. Bug classification is the task of identifying a type of bug that may exist in a source code snippet. A program repair task predicts a bug patch in the context of a code snippet containing a source code bug and its identified bug type and proposes a source code snippet with the bug fix.

The software engineering tasks all require an understanding of source code. Source code differs from a natural language (e.g., English) since programmers use, at times, arbitrary, complex and long names to represent a variable, function or other code elements. Source code can be learned from a large unsupervised abundant corpus of code snippets from different programming languages and/or from natural language code summaries from which a neural transformer model learns statistical properties of the source code, such as syntactic rules of the programming languages, as well as semantic information from co-occurrence of specific variable and method names.

The different software engineering tasks align with a particular neural transformer architecture which allows for the transfer of the weights and biases from the trained model for discriminative fine tuning on specific tasks. As shown in FIG. 1, an unsupervised training dataset is obtained having a large corpus of source code programs and/or natural language text of source code summaries 102 and used by a pre-training component 103 to train an encoder neural transformer model 104, a decoder neural transformer model 106, and encoder-decoder neural transformer model 108 to learn to understand source code. These models are herein referred to as source code domain neural transformer models since they have been trained to understand the statistical properties of source code.

An encoder-only neural transformer model with attention 104 is trained on a large unsupervised training dataset of source code and natural language source code summaries 102. The encoder-only neural transformer model is then fine-tuned by a fine-tuning component 107 with a particular supervised training dataset 106 for a particular source code classification task or code similarity task to produce a corresponding model 110A-110N. An encoder neural transformer with attention is better suited for classification tasks due to the type of attention used in the encoder. An encoder uses bi-directional attention which enables the encoder to learn the relationships of the tokens/subtokens in an input sequence both before and after their occurrence. Classifiers are trained to interpret a model's internal representation into a class label. Since bi-directional attention allows the model's internal representation to depend on all other tokens, and not just the previous tokens, bi-directional attention leads to superior classification performance.

A decoder-only neural transformer model with attention 112 is trained by the pre-training component 103 on a large corpus of unsupervised multi-lingual source code programs. The decoder-only neural transformer model 112 is then fined-tuned by the fine-tuning component 107 using a particular supervised training dataset 114 to generate a respective model for a particular auto-regressive task 118A-118N. The decoder-only neural transformer model is an auto-regressive model that produces an output one element at a time based on the outputs of previous time steps. Line completion is best suited for a decoder neural transformer model since it is an auto-regressive task that predicts an ordered sequence of tokens where the order depends on the preceding tokens in the sequence. The decoder uses a masked self-head attention which is best suited for auto-regressive tasks since it is explicitly trained to generate auto-regressively.

An encoder-decoder neural transformer model with attention 120 is trained by the pre-training component 103 on source code and natural language text and fine-tuned by the fine-tuning component 107 for machine translation tasks 122. A machine translation model learns a function that translates an input sequence into an output sequence. For software engineering tasks, the input sequence is a particular source code construct and the output sequence is another source code construct or natural language text string. For example, the encoder-decoder transformer model 120 may be trained to translate a method signature into a documentation string for the method signature, translate a method signature into a corresponding method body, translate a documentation string for a method into a method body, translate a method body into a method signature, translate a documentation string for a method into a method signature, translate a buggy source code snippet into a repair patch for the buggy source code, and so forth.

In one aspect, the transformer learning system is configured as a web service that creates models for a target software engineering task. A model that is fine-tuned from the pre-trained neural transformer model acts as a tool that is configured to perform the target software engineering task. The web service trains a neural transformer model with attention in the various model configurations to understand source code. The web service fine-tunes a previously-trained neural transformer model on a customer's training dataset in a preferred model and memory size to perform the intended software engineering task. The model can then be run on the web service or transferred to the user's computing device.

It should be noted that that neural transformer models disclosed herein refer to neural transformer models with attention. Attention now turns to a further description of the various neural transformer architectures.

Neural Transformer Architectures

Figure 2:
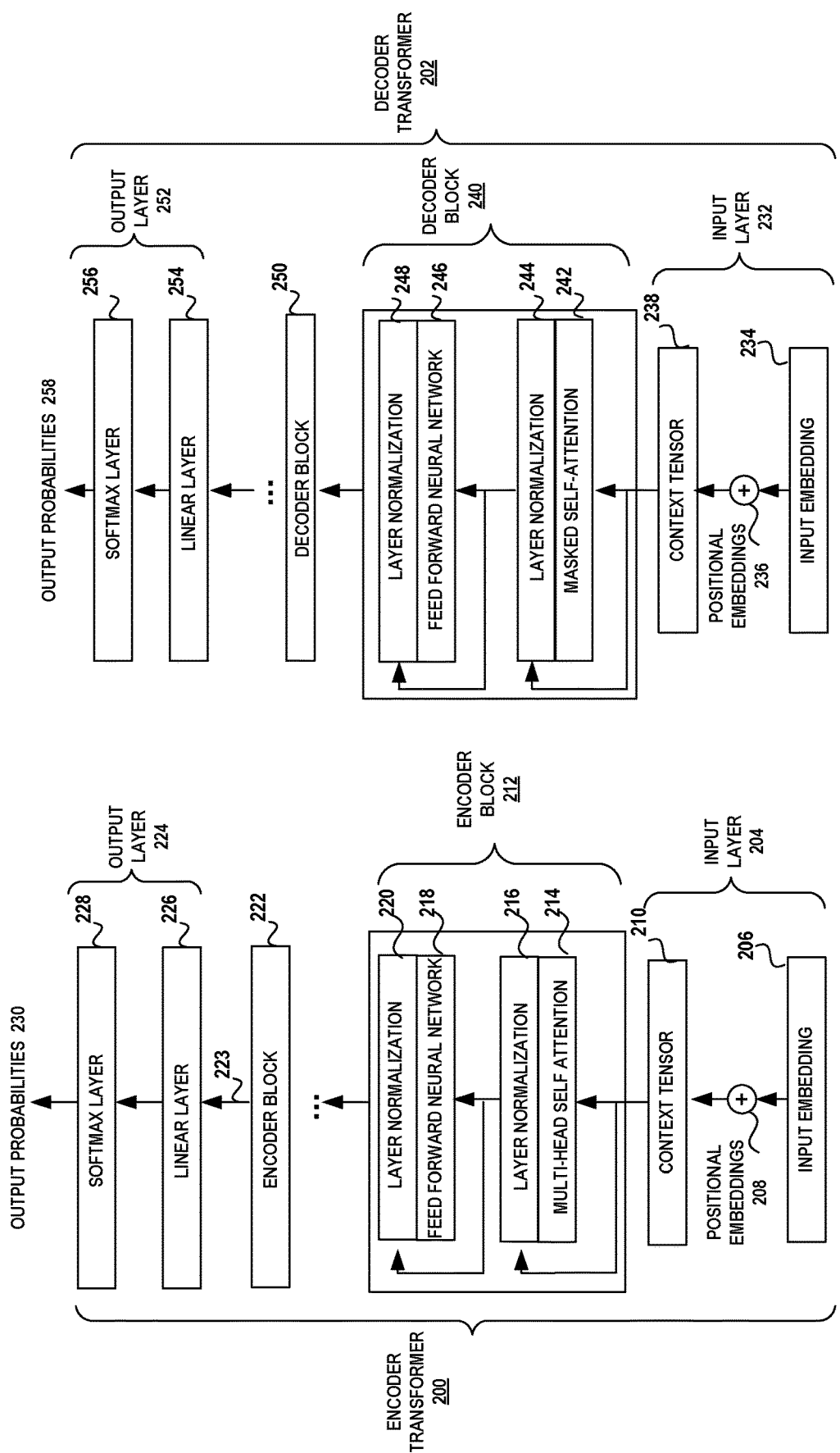
FIG. 2 is a schematic diagram illustrating an exemplary architecture of an encoder and a decoder neural transformer model with attention.
Figure 3:
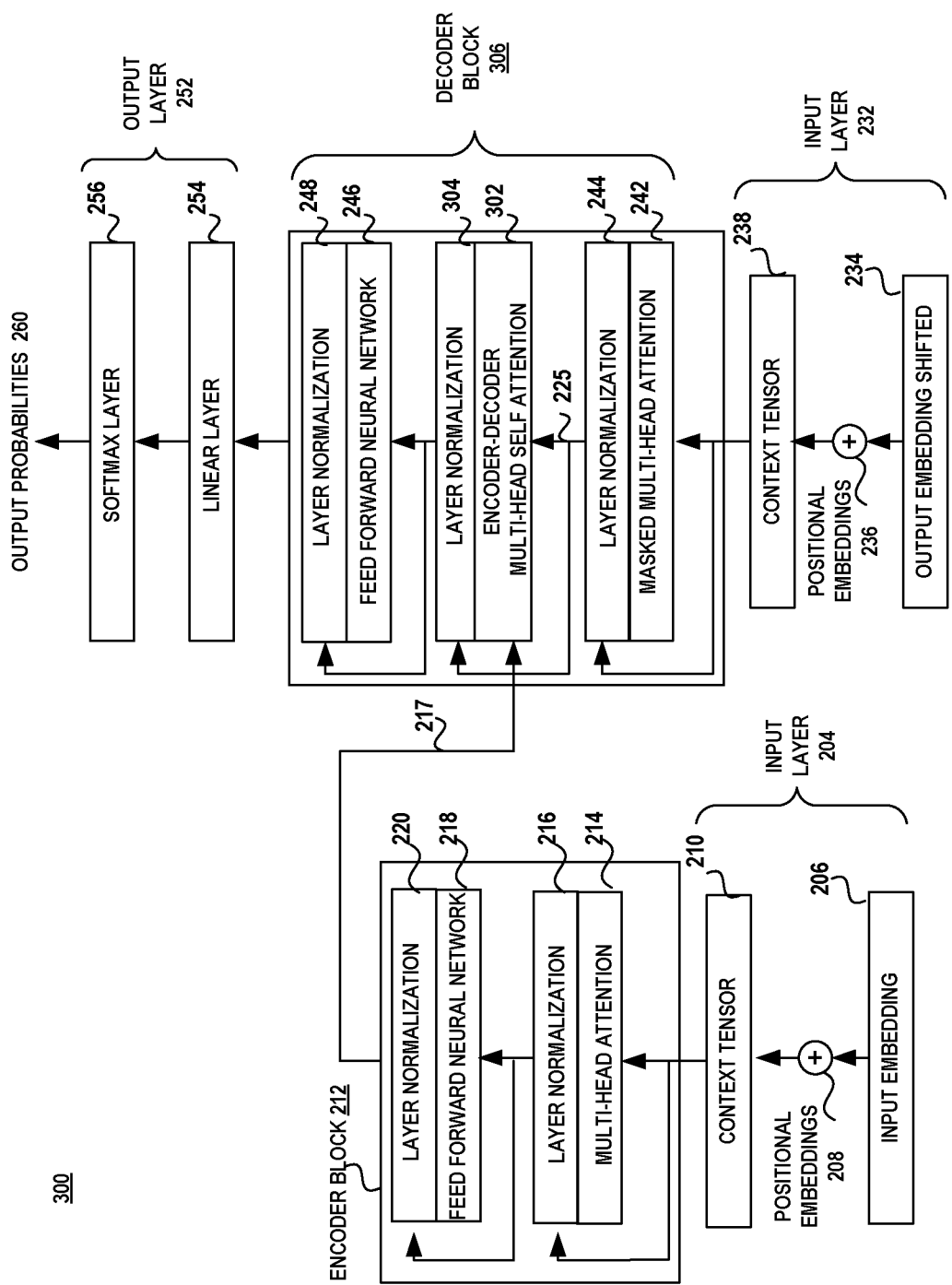
FIG. 3 is a schematic diagram illustrating an exemplary architecture of an encoder-decoder neural transformer model with attention.

There are different configurations for a neural transformer. FIG. 2 shows an exemplary configuration of an encoder neural transformer and a decoder neural transformer. FIG. 3 illustrates an exemplary configuration of an encoder-decoder neural transformer.

Referring to FIG. 2, the encoder neural transformer 200 includes an input layer 204, one or more encoder blocks 212, and an output layer 224. The input layer 204 includes input embeddings of an input sequence of the training dataset 206 and positional embeddings 208 that represents an order of the tokens/subtokens in an input sequence. The input embeddings 206 and the positional embeddings 208 are combined to form a context tensor 210.

An encoder block 212 consists of two layers. The first layer includes a multi-head self attention component 214 followed by layer normalization component 216. The second layer includes a feed-forward neural network 218 followed by a layer normalization component 220. The context tensor 210 is input into the multi-head self attention layer 214 of the encoder block 212 with a residual connection to layer normalization 216. The output of the layer normalization 216 is input to the feed forward neural network 218 with another residual connection to layer normalization 220. The output of each encoder block is a set of hidden representations 223. The set of hidden representations 223 are then sent through additional encoder blocks, if multiple encoder blocks exist.

Attention is used to decide which parts of the input sequence are important for each token/subtoken, especially when decoding long sequences since the encoder is limited to encoding a fixed-size vector. Attention mechanisms gather information about the relevant context of a given token/subtoken and then encode that context into a vector which represents the token/subtoken. It is used to identity the relationships between tokens in the long sequence while ignoring other subtokens that do not have much bearing on a given prediction.

The multi-head self attention component 214 takes a context tensor 210 and weighs the relevance of each token/subtoken represented in the context tensor to each other by generating attention weights for each token/subtoken in the input embedding 206. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token/subtoken in a sequence, K is the vector representations of all tokens/subtokens in the sequence, and V is the vector representations of all the tokens/subtokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots ,\text{head}_h)W^O$$

where $\text{head}_i=\text{Attention}(QW_i^Q, KW_i^K, VW_i^V)$, with parameter matrices $W_i^Q \in \mathbb{R}^{d_{model}\times d_k}$, $W_i^K \in \mathbb{R}^{d_{model}\times d_k}$, $W_i^V \in \mathbb{R}^{d_{model}\times d_k}$, and $W^O \in \mathbb{R}^{hd_v\times d_{model}}$.

In order to reduce the training time of the neural transformer, layer normalization is used between the layers. The layer normalization component normalizes the inputs across the features. The mean and standard deviation is computed across the feature dimensions. There is a first layer normalization 216 that precedes the feed forward neural network 218 and a second layer normalization 220 that follows the feed forward neural network 218. The feed-forward neural network 218 processes each output encoding separately. The output of the top encoder block 222 is a set of attention vectors K and V 223 that represent the last hidden layer.

The output layer 224 consists of a linear layer 226 and a softmax layer 228. The linear layer 226 is a fully-connected neural network that projects the raw scores output by the last layer of the neural network into a logits vector. The softmax layer 228 applies the softmax function to the logits vector to compute a vector that represents the probability distribution of a list of potential outcomes 230.

Decoder

The decoder neural transformer model 202 includes an input layer 232, one or more decoder blocks 240, and an output layer 252. A decoder block 240 consists of two layers. The first layer includes a masked self-attention component 242 followed by a layer normalization component 244. The input to the masked multi-head self-attention component 242 has a residual connection to layer normalization 244. The output of layer normalization 244 is input into the feed forward neural network 246 with a residual connection to layer normalization component 248. The output of the feed forward neural network is input into layer normalization component 248.

Each token/subtoken flows through all the decoder blocks along its own path. The masked self-attention component 242 allows the neural network 246 to focus on certain features or inputs. The inputs to the decoder block 234 are added with the positional embeddings 236 forming context tensor 238. The decoder block 240 predicts each token/subtoken $t_i$ in the target language one-by-one at each time step conditioned on all previously-generated target tokens/subtokens $t_1, \ldots t_{i-1}$.

The masked self-attention component 242 masks the output embeddings from future time steps. The feed-forward neural network 246 processes each output embedding separately. A layer normalization component 244, 248 is used between the layers in order to normalize the inputs across the features.

The linear layer 254 projects the vector produced by the stack of decoders into a logits vector. The softmax layer 256 then turns the scores of the logits vector into probabilities for each token in the vocabulary 258 which are positive and normalized.

Encoder-Decoder

FIG. 3 illustrates an exemplary configuration of an encoder-decoder neural transformer with attention. The model 300 incorporates one or more encoder blocks 212 as described above and one or more decoder blocks. In this particular transformer configuration, the encoder block 212 does not have an output layer. The output of the top encoder block is a set of attention vectors K and V 217 which is used by the encoder-decoder multi-head attention layer 302 of the decoder block 306. The input layer 204 of the encoder block 212 operates as described above.

The decoder block 306 contains a masked multi-head attention component 242, an encoder-decoder multi-head self-attention component 302, and feed forward neural network 246. The output of multi-head attention component 242 is input into layer normalization 244, the output of the encoder-decoder multi-head self-attention component 302 is input into layer normalization 304, and the output of feed forward neural network 246 is input into layer normalization 248. The output of layer normalization 244 has a residual connection to layer normalization 304, the output of layer normalization 304 has a residual connection to layer normalization 248, and the input to the masked multi-head attention 242 has a residual connection to layer normalization 244.

The masked multi-head attention component 242 receives the output embeddings of the previous timestep 234. The masked multi-head attention component 242 masks the output embeddings from future time steps. The encoder-decoder multi-head attention layer 302 receives queries from the previous decoder layer 242 and the memory keys and values 217 from the output of the encoder block 212. In this manner, the decoder block 306 can attend to every position of the input sequence.

Web Service

Attention now turns to a description of an exemplary embodiment of the transfer learning system as a web service for generating neural transformer models with attention for a targeted software engineering task on a user's supervised dataset.

Figure 4:
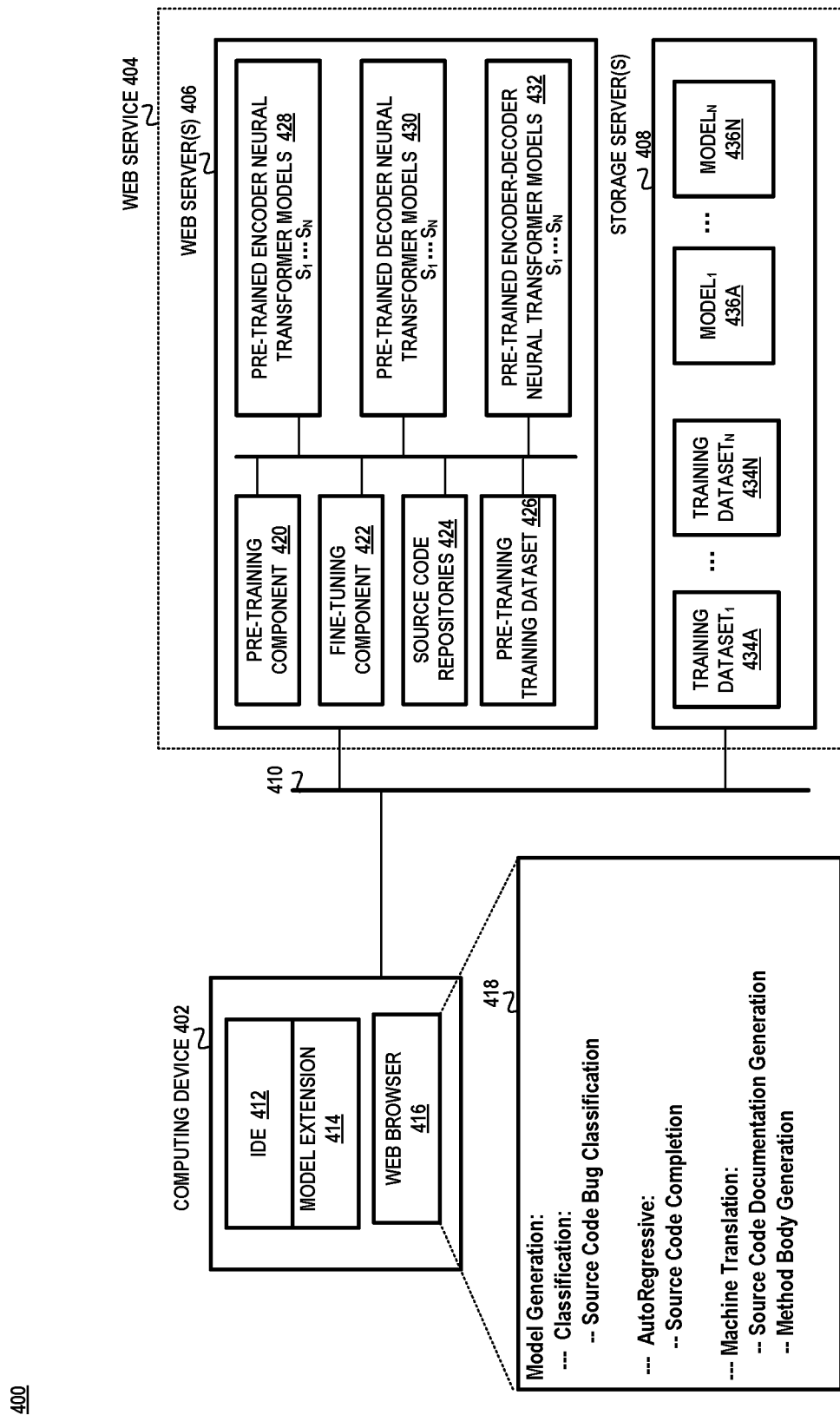
FIG. 4 is a schematic diagram illustrating an exemplary transfer learning system implemented as a web service.

Turning to FIG. 4, there is shown an exemplary system 400 having one or more computing devices 402 connected to a web service 404 through a network 410. The web service 404 contains one or more web servers 406 connected to one or more storage servers 408. A web server 406 may contain a pre-training component 420 that pre-trains the source code domain neural transformer models in each configuration, a fine-tuning component 422 that fine-tunes a pre-trained model for a target software engineering task, one or more source code repositories 424, and one or more pre-training training datasets 426.

The web server 406 also contains several pre-trained encoder transformer models 428, several pre-trained decoder transformer models 430, and several pre-trained encoder-decoder neural transformer models 432. In one aspect, each pre-trained model is configured with a pre-configured model size, $S_1, \ldots, S_N$. For example, a small-sized encoder model, $S_1$, may consist of twelve (12) encoder blocks, a medium-sized encoder model, $S_2$, may use eighteen (18) encoder blocks, and a large-sized encoder model, $S_N$, includes twenty-four (24) encoder blocks, 428. A small-sized decoder model, $S_1$, may consist of twelve (12) decoder blocks, a medium-sized decoder model, $S_2$, may include twenty-four (24) decoder blocks, and a large-sized decoder model, $S_N$, may include thirty-six (36) decoder blocks, 430. A small-sized encoder-decoder model, $S_1$, includes six (6) encoder blocks and six (6) decoder blocks, a medium-sized encoder-decoder model, $S_2$, includes nine (9) encoder blocks and nine (9) decoder blocks, a large-sized encoder-decoder model, $S_N$, includes twelve (12) encoder blocks and twelve (12) decoder blocks, 432.

The web server 404 is coupled to a cloud-based storage server 408 that provides a file system service to store data for users. The storage server 408 contains the user's training datasets, 434A-434N, and the user's fine-tuned models, 436A-436N. In one aspect, the storage server and the web server may be part of a web service such as Microsoft Azure®. Microsoft Azure® is a cloud computing service for building, testing, developing, and managing application and services.

A user (i.e., developer, programmer, customer) interacts with the web service 404 through a computing device 402 for the generation of a neural transformer model that performs a particular software engineering task. The user may interact with the web service 404 through a web browser 416. The web page 418 of the web service details the types of software engineering tasks that are offered. The user provides the web service with a configuration file that includes the type of software engineering task, the location of the supervised training dataset in the storage server, the model size, and memory constraints, if any.

The web service 404 generates a model for the user in accordance with the user's configuration file. Upon completion of the model, the model may be transmitted back to the user's computing device and used as a tool. For example, the model may be used as an extension, add-in, or plug-in 414 to an integrated development environment (IDE) or source code editor 412. The model may be used to perform a feature not offered by the IDE or source code editor or to enhance an existing feature. Alternatively, the model may be stored in the storage server and configured to operate in a virtual environment created by the user using the computational resources of the web service 404.

Pre-Training

Figure 5:
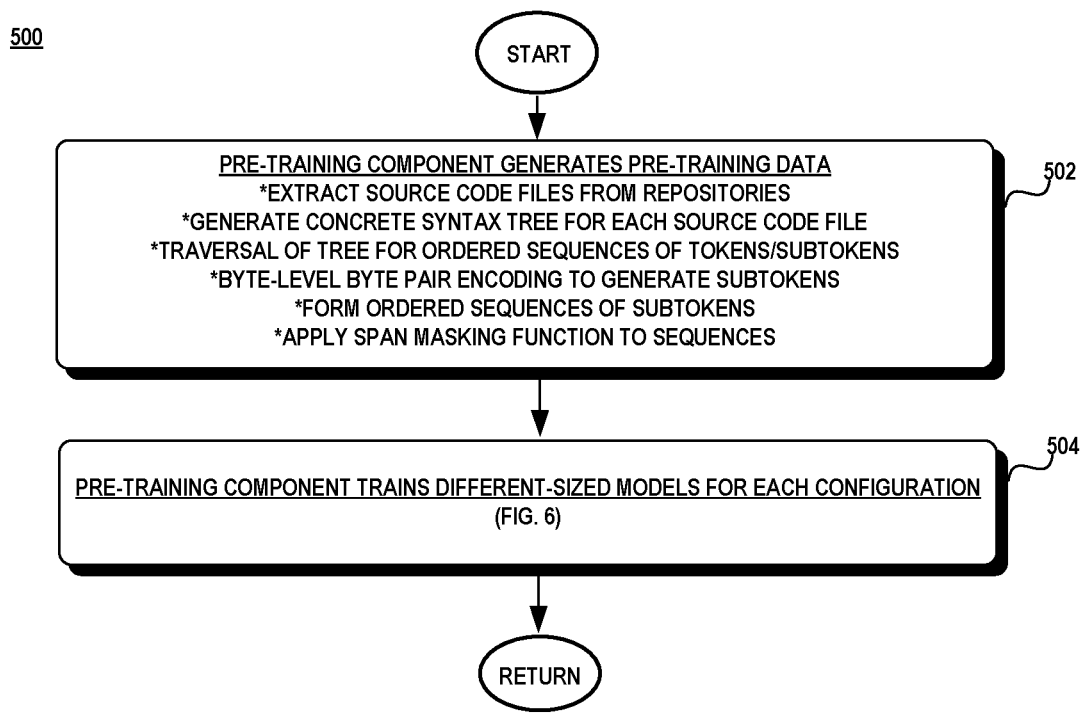
FIGS. 5 and 6 are flow diagrams illustrating exemplary methods for training source code domain neural transformer models in different configurations and model sizes.

Attention now turns to training the source code domain neural transformer models in the various configurations. Turning to FIG. 5, the pre-training component generates a pre-training training dataset (block 502) which is then used to train each of the models in each model size (block 504).

The pre-training component generates a pre-training dataset from a diverse corpus of unlabeled source code programs or files. In some aspects, the pre-training dataset may also include natural language text that pertains to a source code file such as source code summaries which describe the operation of a source code construct. This is referred to as unsupervised learning since the model draws inferences from the input data without labeled input. The pre-training component extracts selected source code files from various source code repositories. The source code files contain context beyond method bodies, method signatures, and docstrings, such as imports, globals, comments, and scripts. (Collectively, block 502).

A source code repository may be a file archive and web hosting facility that stores large amounts of source code either privately or publicly. A source code repository can be structured as a version control system, such as GIT, Mercurial, etc. The source code files residing in the source code repository vary and may be written in different programming languages. The selected source code files can come from different domains, such as without limitation, scientific computing, web development, dataflow programming, machine learning, and the like. (Collectively, block 502).

The pre-training component transforms each of the selected source code files into a concrete syntax tree. The concrete syntax tree represents the source code text in the parsed form. The concrete syntax tree may also be a parse tree. A concrete syntax tree represents the syntactic structure of a program in a hierarchical or tree structure. The concrete syntax tree is an n-ary tree data structure that includes nodes that represent a construct in the grammar of the programming language of a program. The concrete syntax tree includes one root node, multiple internal nodes, and multiple terminal nodes. The terminal nodes represent the tokens. A token is a symbol that represents an operand or an operator. The concrete syntax tree differs from an abstract syntax tree where the terminal nodes represent operands. (Collectively, block 502).

The pre-training component uses a tokenizer to extract tokens/subtokens from the concrete syntax tree. In one aspect, the neural transformer models utilize a Byte-level Byte-Pair Encoding tokenizer to generate subtokens to represent ordered sequences of source code snippets. Unlike a natural language (e.g., English, etc.), programmers use, at times, arbitrary, complex and long names to represent a variable, function or other code elements which may result in an extremely large vocabulary for the model when a large number of source code programs are used to train the model. To reduce the size of the vocabulary, less-frequently occurring tokens are split into subtokens. A subtoken is a portion of a token that is in between a token and a single character. The subtokens are used to account for rare or unseen tokens (i.e., out-of-vocabulary tokens) that may appear in a target source code program. The use of the subtokens allows the model to learn and generate the out-of-vocabulary tokens. (Collectively, block 502).

Byte-level byte-pair encoding (BBPE) is used to generate the vocabulary used by a neural transformer model. A text string, either a sequence of source code or a natural language text, is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 502).

The byte-level subwords are generated using the Byte Pair Encoding (BPE) algorithm. The vocabulary is seeded with 256 American Standard Code for Information Interchange (ASCII) characters and then greedily grown by adding the merge of the most common pair of consecutive tokens in each iteration. This type of encoding does not rely on knowing the underlying language making it suitable for an input sequence of text strings that contain source code and/or natural language text. The ordered sequences of UTF-8 bytes are translated into a T-ordered sequence of subtokens which are vector representations of a source code fragment or natural language text. The T-ordered sequence of subtokens are represented in a context vector. (Collectively, block 502).

It should be noted that in bi-modal training, a model having been trained on English language text may be reused to train on source code. In this situation, the source code training would have to augment the vocabulary with indent and dedent tokens to account for large spans of white spaces that is used in some programming language, such as Python. A further discussion of this issue is described in more detail below.

Each source code program in the training dataset does need not be written in the same programming language. The training dataset may be composed of numerous source code programs, each of which may be written in a different programming language. Each source code program in the training dataset is encoded into a sequence composed of tokens and/or subtokens. The frequently-used elements in a programming language are encoded into tokens and the less frequently-occurring elements are encoded into combinations of characters referred to as subtokens. This reduces the need to store a large vocabulary and provides better accuracy for out-of-vocabulary tokens. For simplicity, the term subtoken shall include tokens and subtokens.

A noising transformation, such as a span masking function, is then applied to each sequence that randomly masks out a subset of subtokens and the masked span of subtokens is replaced with a mask subtoken, M. The model is trained with the masked sequences to learn to reconstruct the original sequence without the masked subtokens. In one aspect, the mask subtoken replaces a span of subtokens. The number of text spans and the span lengths are randomly generated and each span is replaced with a single mask subtoken. The masked denoising is based on the doze task of evaluating human language-learners' proficiency, in which humans are given a foreign language with missing words, and are asked to correctly choose the missing word. The benefit of span-masking denoising in pre-training is that the model learns the desired language in an unsupervised fashion, but also is bi-directional in the sense that it learns the relationships of words both before and after their occurrence. (Collectively, block 502).

Figure 6:
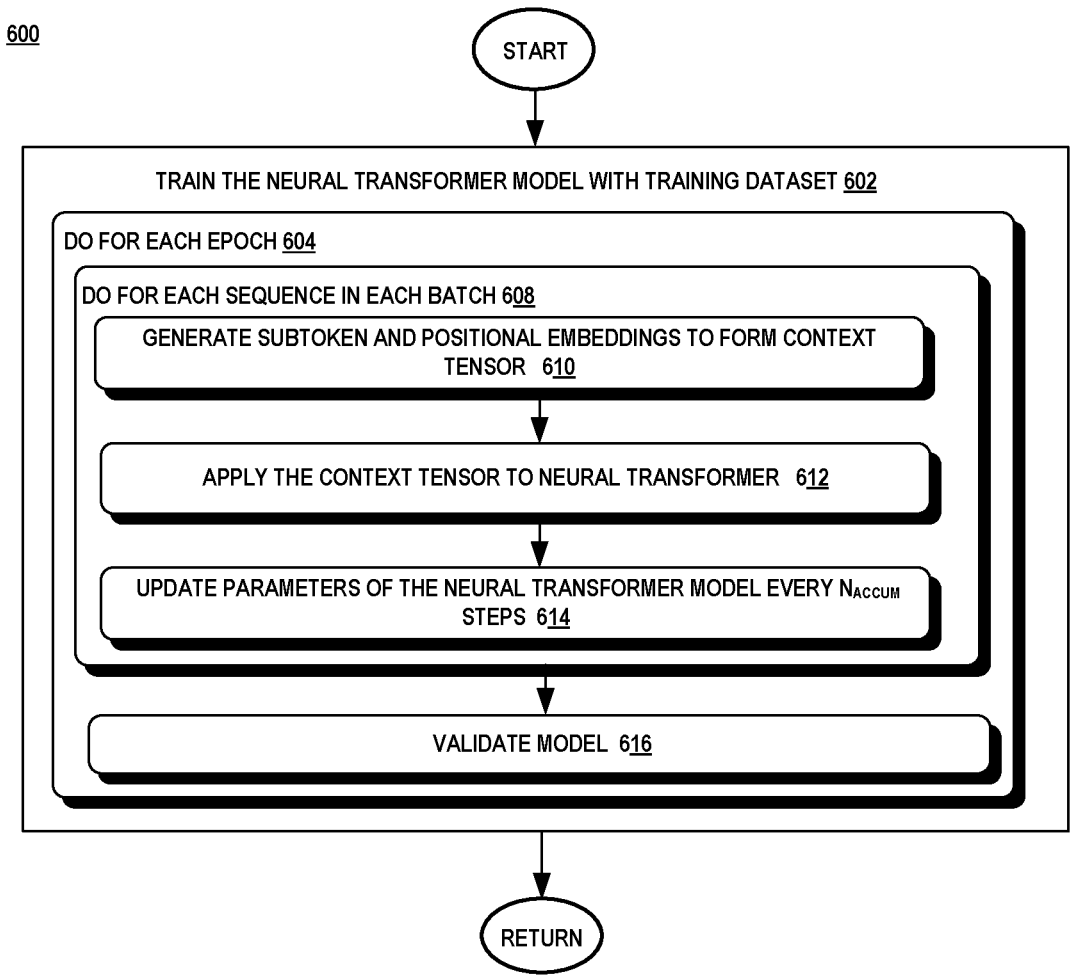

The pre-training component then trains a neural transformer model in each configuration in each of the model sizes with the pre-training dataset (block 504). FIG. 6 illustrates a method 600 for training a neural transformer model. The method 600 is used to train a source code domain encoder neural transformer model with attention in several model sizes, a source code domain decoder neural transformer model with attention in several model sizes, and a source code domain encoder-decoder neural transformer model with attention in several model sizes.

Turning to FIG. 6, neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 602).

The neural transformer model has multiple blocks and layers within each block so that more detailed relationships within the data are learned as well as how the features interact with each other on a non-linear level. The model architecture, training procedure, data normalization and vocabulary encoding procedures are hyperparameters that are tailored to meet a particular objective. The parameters of a model are the values of the model, such as the weights (e.g., K, V, We, Wp). The hyperparameters influence the way the model is built and how the parameters are learned. (Collectively, block 604).

In one aspect, the hyperparameters may include the following: (1) subtoken and position embedding layers of dimensions: 30000×768, and 1024×768 respectively; (2) the configuration of the neural transformer model in a particular configuration with a number of encoder blocks and/or decoder blocks; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and the learning rate is 0.0001; (4) the data normalization procedure: normalize all string and numerical literals, keeping the ten most frequent; and (5) the vocabulary encoding procedure: byte-level byte-pair encoding, preserve the ten most frequent string and numerical literals encoding them as a single token during byte-level byte-pair encoding procedure; and introduce special control flow tokens to denote end-of-line, end-of-file, end-of-method, dedent, and indent symbols. (Collectively, block 604).

For each sequence of each batch in each epoch (blocks 608, 610), the T-ordered sequences of subtokens are then mapped into numeric vectors and then into respective subtoken embeddings and positional embeddings (block 610). An embedding is a learned representation for the text-based subtokens where subtokens that have a common meaning have a common representation. An embedding is a mapping of discrete categorical variables to a vector of continuous numbers. There is an embedding for each subtoken in the vocabulary and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to embed position information about a subtoken's position in a sequence into a respective neural transformer model.

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 . . . V, and a positional embedding matrix, Wp, that contains an embedding vector $P_j$, j=0 . . . T, for each position, where V is the size of the vocabulary and T is the length of the subtoken sequence. (Collectively, block 610).

The context tensor is input into a respective neural transformer model and passed through the multiple layers of the neural transformer model. For the encoder neural transformer model, the multi-head self attention layer takes the context tensor as input and passes it through the multiple layers of multi-head attention, layer normalization and feed forward neural network of each encoder block to finally produce a set of hidden representations. For decoder neural transformer model, the masked self-attention layer takes the context tensor as input and passes it through the multiple layers of multi-head attention, layer normalization and feed forward neural network of each decoder block to finally produce a set of hidden representations. (Collectively, block 612).

For the encoder-decoder neural transformer model, the first encoder block of the neural transformer model takes the context tensor as input and passes it through the multiple layers of multi-head attention, layer normalization and feed-forward neural network to finally produce a set of hidden representations If there are additional encoder blocks, the output of each encoder block is passed onto the next encoder block with the output of the last encoder block producing the set of hidden representations. The set of hidden representations is passed onto each decoder block. (Collectively, block 612).

The decoder blocks of the neural transformer model take a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 612).

For the encoder neural transformer, the decoder neural transformer, and the encode-decoder neural transformer, the feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation algorithm may be used to update the weights. (Collectively, block 612).

At the completion of each batch, the parameters of a respective neural transformer model are updated at a pre-configured frequency denoted as Naccum. Naccum is a gradient accumulation frequency and in one aspect has a value of 8. The parameters include the subtoken embeddings and the positional embeddings which are stored in a respective embedding matrix. (Collectively, block 614).

Next, a neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 616).

Tool Generation

Figure 7:
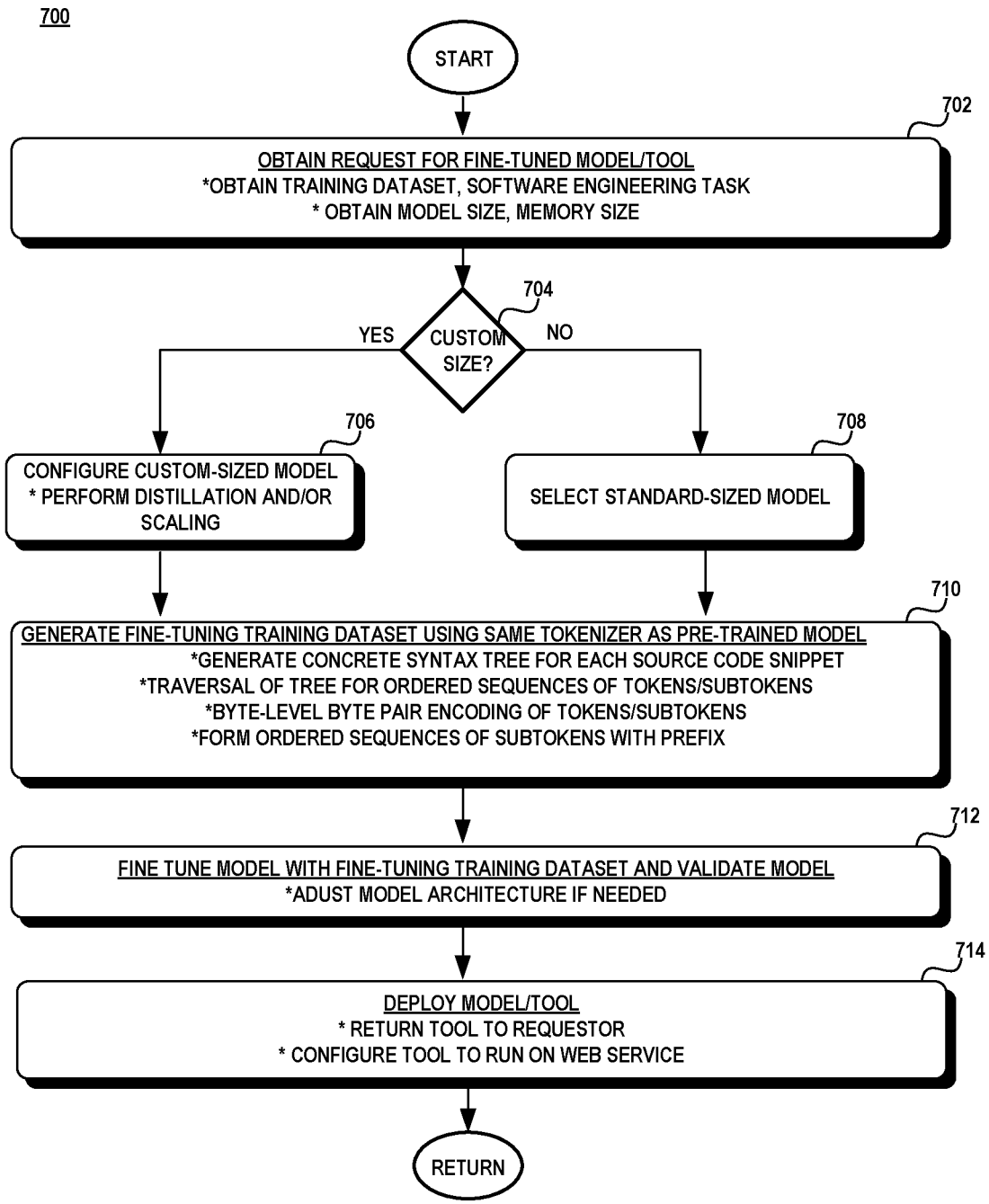
FIG. 7 is a flow diagram illustrating an exemplary method of the web service processing requests for the generation of a neural transformer model for a particular software engineering task.

Attention now turns to the generation of a model for a particular software engineering task. FIG. 7 illustrates an exemplary method 700 of the web service.

The web service receives or obtains a request for a model in a particular configuration. The request may be embodied in a configuration file that includes the intended software classification task, the model size, the memory size and the location of the training dataset. The model size indicates the number of encoder and/or decoder blocks and the memory size indicates the amount of memory that the model should consume. Each of the pre-trained source code domain neural transformer models has a model size and a memory size. The memory size of a pre-trained model is the product of the number of model parameters and the number of bytes used to store a model parameter. (Collectively, block 702).

In some instances, the intended use of the model may be constrained by the memory size of the model. For example, if the model is to be deployed in a cloud computing service that charges for the amount of computing resources that are consumed by the execution of the model, the model may be limited by its memory size or the model size. Alternatively, if the web service charges for the computing resources used to develop the model, the memory size or model size may be limited. (Collectively, block 702).

The software engineering task is associated with a particular type of neural transformer model. For example, a classification task is often performed using an encoder neural transformer model, an auto-regressive task is often performed using a decoder neural transformer model, and a sequence-to-sequence translation or machine translation task is often performed using an encoder-decoder neural transformer model. (Collectively, block 702).

If the request is for a model that adheres to the size requirements of one of the pre-trained source code domain neural transformer models provided by the web service, then the pre-trained model is selected with the standard model size (blocks 704—no, 708). Otherwise, if the request is for a model size on disk and/or in memory that has not been pre-trained, then a custom size is computed (blocks 704—yes, 706).

The custom size may indicate a particular configuration of the transformer blocks and/or memory size constraint of the model. If the request indicates a particular configuration of the transformer blocks that is not available on the web service, then the model with the closest number of blocks to the particular configuration is chosen. Knowledge distillation is a model compression technique in which a smaller model, the student neural transformer model, is trained to reproduce the results of the larger model, the teacher neural transformer model. Model compression via knowledge distillation is used to reduce the number of transformer blocks of the pre-trained (teacher) neural transformer model to suit the requested (student) neural transformer model size. (Collectively, block 706)

In knowledge distillation for a decoder-only model, where a model is pre-trained to predict a next token probability distribution over a vocabulary, the student neural network is trained with a distillation loss over the target probabilities of the teacher $L1=\Sigma_i t_i * \log(s_i)$, where $t_i$ is a probability of a given class estimated by the teacher, and $s_i$ is a probability of a given class estimated by the student. The total training loss is a linear combination of the distillation loss L1, the loss for a particular pretraining task L2 (cross-entropy loss for autoregressive language modeling task in the case of decoder-only model), and the cosine embedding loss L3 which tends to align the directions of the student and teacher output hidden states.

For example, if the request is for an encoder-decoder model with three encoder blocks and three decoder blocks and the smallest pre-trained encoder-decoder model has six encoder blocks and six decoder blocks, the smallest pre-trained encoder-decoder model is used where encoder and decoder blocks 1, 3, and 6 are transferred and all other blocks are eliminated (block 706).

If the request includes a memory size limitation that is not met by any of the pre-trained models, then a scaling factor is computed to determine the acceptable model size. The scaling factor is used to calculate how many transformer blocks to keep for knowledge distillation. Knowledge distillation uses teacher-student training approach to ensure the model of reduced size is accurate. For example, if the request is for the largest decoder neural transformer model that can fit into 100 MB of memory and the smallest pre-trained decoder neural transformer model is 460 MB with twelve decoder blocks, then a scaling factor is computed to suggest keeping only three decoder layers. The following formula is used to scale the number of trainable parameters in a transformer model:

Scaling of number of trainable parameters $(n)=D*(|V|+Nctx)+A*n*d\_model^2$, where D is the embedding dimension, |V| is the vocabulary size, Nctx is the input sequence length, d_model is the number of hidden units per transformer block, n is the number of transformer blocks, and A is a constant equal to 12. In one aspect, all the parameters in the scaling formula are kept fixed, except for n which is the number of transformer blocks which is reduced to lower the model size. (Collectively, block 706).

The fine-tuning component generates the fine-tuning training dataset using the training dataset provided in the request. The training dataset is split into input sequences for training, testing and validation subsets. The input sequences are constructed in the same manner as the training dataset for the pre-trained model. Source code snippets are parsed to form a concrete syntax tree from which tokens/subtokens are extracted. Byte-level byte-pair encoding is used to form the subtokens. An ordered sequence of subtokens in formed with a corresponding prefix or label thereby forming a supervised training dataset. (Collectively, block 710).

The fine-tuning component then trains the selected pre-trained neural transformer model with the supervised training dataset (block 712).

In the case of fine-tuning a source code domain encoder neural transformer for a specific classification task, the output layer of the pre-trained model is replaced with a classification layer while reusing all encoder blocks. In one aspect, the fine-tuning component trains the model end-to-end, fine tuning all the pre-trained parameters for a small number of epochs (i.e., 5 epochs). Upon completion of the training, the model is validated. (Collectively, block 712).

For example, an exemplary software engineering classification task is a software bug classification task where an encoder neural transformer model can identify whether a code snippet is likely to have a particular type of source code bug. The output of the model is a probability distribution containing a probability for each type of source code bug or class the model is trained to predict. The bug types or classes may be a null pointer reference, an immutable cast, an empty vector access, and so forth.

The bug classification model is constructed from a transfer learning process that starts with the source code domain encoder neural transformer model (i.e., pre-trained encoder neural transformer model) which is then fine-tuned with a supervised training dataset that includes code snippets having an identified bug type with a prefix that identifies the bug type. The fine-tune training makes minimal architectural changes to the pretrained model, reusing all layers of the pre-trained model and reconfiguring the output layer, which is a classification layer tailored for the particular classes that represent the bug types. Fine tuning is applied to all the parameters of the pretrained model and the output layer. The fine-tuning training is not a computationally expensive task, as it only requires a few training epochs to conclude.

The output layer of the pre-trained model is replaced with a classification layer that learns a new weight matrix of dimension K×H from randomly-initialized values, where K is the number of classes in a downstream classification task and where H is the dimension of the output of last encoder block. The output layer of the pre-trained model is not used since its weight matrix is of a different size that may not contain the classes of the target classification task. Instead, the new classification layer which has the number of hidden units set to the number of classes K of the fine-tuning classification task with a softmax activation function. The predicted probability P for the j-th class given an output of last encoder block x and weight matrix W corresponding to the classification layer is as follows:

$P(y=j|x) = \exp(x^T W_j + b) / [\sum_{k=1...k} \exp(x^T W_k + b)]$, where K is the number of classes, W is the weight matrix of dimension K×H, H is the dimension of x, the output of last encoder block, b is the bias value.

In the case of a source code domain decoder neural transformer model, the architecture of the pre-trained mode does not need to be altered to be fine-tuned on autoregressive software engineering tasks. The weights and biases of the pre-trained model can be used as a good starting point to train the model on fine-tuning tasks. The pre-training dataset may cover large amounts of source code files in different programming languages, natural language source code summaries, and documents containing natural language. The fine-tuning dataset may be restricted to the function-level data containing function signatures and bodies extracted from programs, buggy code sequences with an identified bug type, code sequences containing bug and corresponding fixed code.

The pre-trained encoder-decoder neural transformer model is used for machine translation. If the fine-tuning task uses the same vocabulary as the pre-trained model, then no changes to the embedding layer or encoder blocks of the encoder-decoder neural transformer model are performed.

If the fine-tuning task requires a different vocabulary than the pre-training stage, then the embedding layer of the pretrained model is not transferred for finetuning and a randomly initialized embedding layer is used instead. The encoder blocks and the decoder blocks from the pre-trained encoder-decoder are transferred. The fine-tuning component uses the supervised training dataset to fine tune all the model parameters end-to-end, for a small number of epochs (i.e., 5 epochs) and validates the model. (Collectively, block 712).

Upon completion of the fine-tuning process, the model is deployed for its intended software engineering task. In one aspect, the model may be returned to the user or alternatively, the model may be stored in the web service and used in the web service. (Collectively, block 714).

Exemplary Operating Environment

Figure 8:
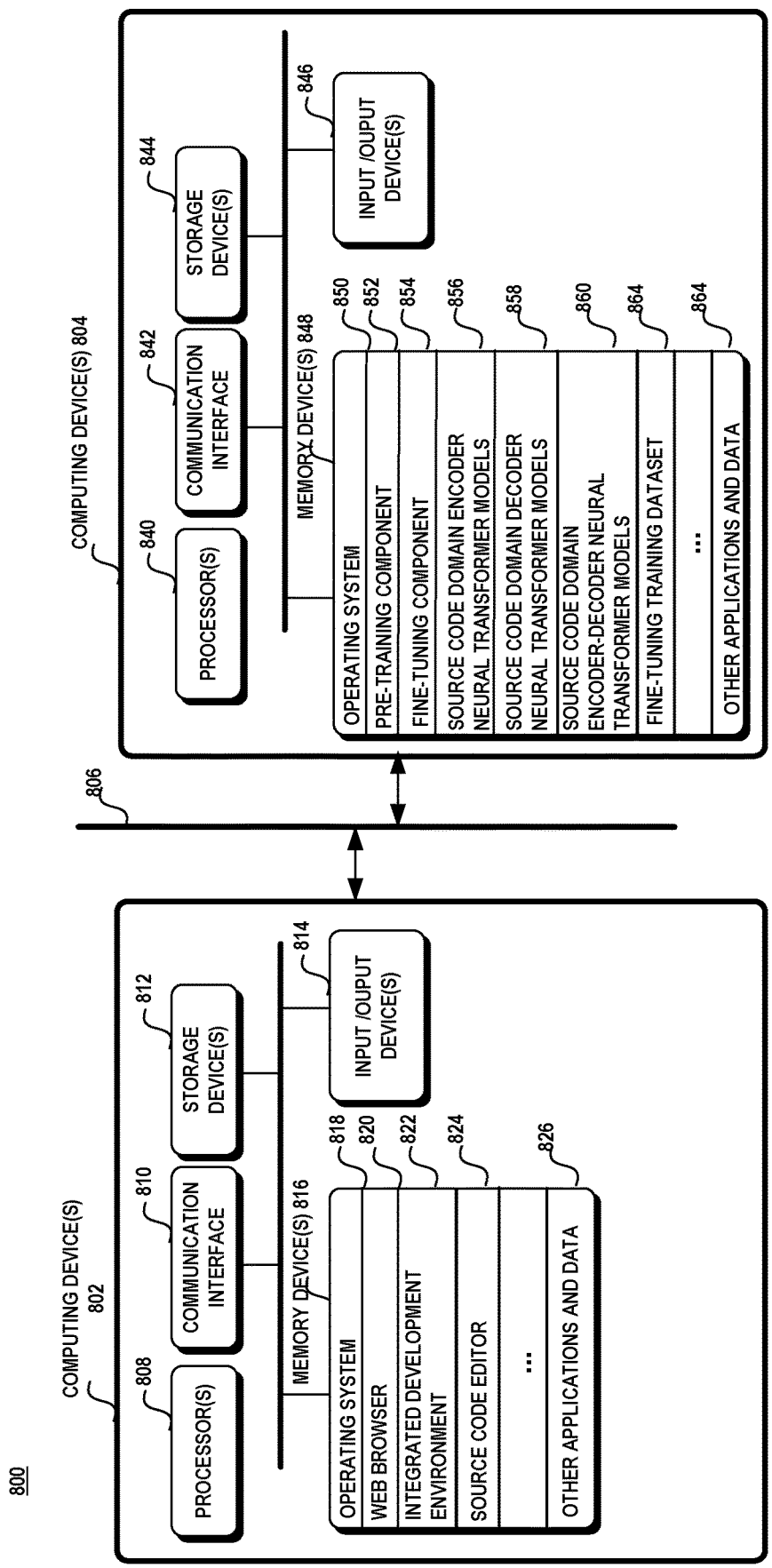
FIG. 8 is a block diagram illustrating an operating environment.

Attention now turns to a discussion of an exemplary operating environment 800. FIG. 8 illustrates an exemplary operating environment 800 in which a first computing device 802 interacts with a second computing device 804, through a network 806, for the generation of a neural transformer model that performs a target software engineering task. In one aspect, the first computing device 802 may be associated with a user that interfaces with a web service consisting of one or more computing devices 804. The web service develops source code domain neural transformer models and fine-tunes a select pre-trained model using supervised training datasets of the user. However, it should be noted that the aspects disclosed herein is not constrained to any particular configuration of devices. Any one of the computing devices 802, 804 may develop one or more of the source code domain neural transformer models and fine-tune a model for an intended software engineering task. It should be noted that the operating environment is not limited to any particular configuration and other configurations are possible.

The computing devices 802, 804 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

The computing devices 802, 804 may include one or more processors 808, 840, one or more communication interfaces 810, 842, one or more storage devices 812, 844, one or more input/output devices 814, 846, and one or more memory devices 816, 848. A processor 808, 840 may be any commercially available or customized processor and may include dual microprocessors and multi-processor architectures. A communication interface 810, 842 facilitates wired or wireless communications between the computing device 802, 804 and other devices. A storage device 812, 844 may be computer-readable medium that does not contain propagating signals, such as modulated data signals transmitted through a carrier wave. Examples of a storage device 812, 844 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 812, 844 in the computing devices 802, 804. The input/output devices 814, 846 may include a keyboard, mouse, pen, voice input device, touch input device, display, speakers, printers, etc., and any combination thereof.

A memory device 816, 848 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 816, 848 may also include one or more external storage devices or remotely located storage devices that do not pertain to propagated signals, such as modulated data signals transmitted through a carrier wave.

The memory device 848 of computing device 804 may contain instructions, components, and data. A component is a software program that performs a specific function and is otherwise known as a module, program, component, and/or application. The memory device 848 may include an operating system 850, a pre-training component 852, a fine-tuning component 854, one or more source code domain encoder neural transformer models 856, one or more source code domain decoder neural transformer models 858, one or more source code domain encoder-decoder neural transformer models 860, one or more fine tuning training datasets 862, and other applications and data 864.

The memory device 816 of the computing devices 802 may include an operating system 818, a web browser 820, an integrated development environment 822, a source code editor 824, and other applications and data 826.

The computing devices 802, 804 may be communicatively coupled via a network 806. The network 806 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 806 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In one aspect, a method to reuse models pretrained on English, whose tokenizers by default handle spans of whitespace poorly can be overcome by augmenting English tokenizers with whitespace tokens representing spans of individual whitespace characters or changes in indentation level, greatly improving throughput and the effective context window length. In another aspect, there can be further pretraining on source code and related natural language before finetuning. Alternatively, fine-tuning can be performed on these augmented English checkpoints on source code tasks as a strong baseline.

Code differs from natural language in that source code follows a formal tree structure, represented for instance by a piece of the source code's concrete syntax tree. This tree structure is typically represented in an IDE using whitespace tokens. Developers typically use four space-tokens to represent going one level deeper in the tree, using for instance twenty-four spaces to represent a line of code that is six layers deep in the tree. This whitespace is syntactically necessary in some languages like Python, and extremely helpful for readability in all programming languages. However, as this use of whitespace is rare in English, tokenizers trained on English tend to only have individual whitespace tokens. Thus, using an English tokenizer to represent a line of code at depth-six in a tree would require twenty-four subwords just to represent the leading whitespace, and typically fewer subwords to represent the rest of the line. This is extremely inefficient, and, in practice, means that only two-third's as much code can be processed in any given context window, period of time, or amount of computation. Two separate solutions to this problem are proposed. One solution is to train a byte-level tokenizer on source code, extract the learned whitespace tokens (such as the 24-space token), and append them to the pre-existing English tokenizers. A second solution is to add <INDENT> and <DEDENT> tokens representing changes in indentation level. For instance, to represent the indentation of a line at depth-six below a line at depth-five a single leading <INDENT> token would be used.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

A system is disclosed having one or more processors; and a memory that stores one or more programs that are configured to be executed by the one or more processors. The one or more programs including instructions that: train a plurality of source code domain neural transformer models with attention on an unsupervised training dataset of source code, the plurality of source code domain neural transformer models with attention including an encoder-only neural transformer model with attention, a decoder-only neural transformer model with attention, or an encoder-decoder neural transformer model with attention; obtain a supervised training dataset for a specific software engineering task; select one of the plurality of source code domain neural transformer models with attention; and fine-tune the selected source code domain neural transformer models with attention with the supervised training dataset to perform the specific software engineering task.

In one aspect, the one or more programs include further instructions that: associate one or more software engineering tasks with a particular one of the plurality of source code domain neural transformer models; and choose the selected source code domain neural transformer model with attention based on the software engineering task. In one aspect, the one or more programs include further instructions that: train at least one of the plurality of neural transformer models with attention in a plurality of standard model sizes. In one aspect, the one or more programs include further instructions that: obtain a requested model size; choose a standard model size closest to the requested model size; and alter one or more blocks of the selected source code domain neural transformer model with attention in the standard model size to meet the requested model size.

In one aspect, the one or more programs include further instructions that: perform knowledge distillation on unaltered blocks of the selected source code domain neural transformer model with attention. In one aspect, a standard model-sized neural transformer model with attention has a memory size; and wherein the one or more programs include further instructions that: obtain a requested memory size; and alter the selected source code domain neural transformer model with attention to meet the requested memory size. In an aspect, the unsupervised training dataset includes natural language text of source code summaries.

A method is disclosed comprising: providing a plurality of neural transformer models with attention having been trained on an unsupervised training dataset of source code, each model having a standard configuration of transformer blocks; obtaining a request to train a second neural transformer model with attention with a requested configuration of transformer blocks that is less than the standard configuration to perform a particular software engineering task; transferring a subset of the transformer blocks of a select one of the plurality of neural transformer models to configure the second neural transformer model with attention with the requested configuration of transformer blocks; and training the second neural transformer model with a supervised training dataset to perform the particular software engineering task.

In an aspect, the method further comprises: configuring a first one of the plurality of neural transformer models with attention with encoder-only transformer blocks; and associating a classification software engineering task with the first neural transformer model. In an aspect, the method further comprises: replacing an output layer of the first neural transformer model with attention with a classification layer configured for the supervised training dataset. In an aspect, the method further comprises: configuring a second one of the plurality of neural transformer models with attention with decoder-only transformer blocks; and associating an auto-regressive software engineering task with the second neural transformer model.

In an aspect, the method further comprises: configuring a third one of the plurality of neural transformer models with attention with encoder-decoder transformer blocks; and associating a machine translation software engineering task with the third neural transformer model. In an aspect, the method further comprises: employing a scaling function to determine the number of transformer blocks to transfer; and applying knowledge distillation to the transferred transformer blocks. In an aspect, the supervised training dataset includes source code snippets from different programming languages. In an aspect, the supervised training dataset includes natural language code summaries.

A device is disclosed having one or more processors and a memory. The one or more processors are configured to: train a set of neural transformer models with attention on an unsupervised training dataset of source code snippets, the set including a neural transformer model with attention having encoder-only blocks, a neural transformer model with attention having decoder-only blocks, and a neural transformer model with attention having encoder-decoder blocks; obtain a supervised training dataset of a software engineering task; select one of the neural transformer models with attention; transfer the blocks of the selected neural transformer model with attention to a second neural transformer model with attention; and fine-tune the second neural transformer model with attention with the supervised training dataset to generate a tool that performs the software engineering tool.

In an aspect, the unsupervised training dataset of source code snippets includes source code snippets in different programming languages. In an aspect, the one or more processors are configured to: apply knowledge distillation to the transferred blocks. In an aspect, the one or more processors are configured to: associate the software engineering task with a select one of the neural transformer models with attention. In an aspect, the one or more processors are configured to: deploy the tool in an integrated development environment.

What is claimed:

1. A system, comprising:
a processor; and
a memory that stores a program configured to be executed by the processor, the program including instructions to perform actions that:
provide a plurality of neural transformer models with attention trained on source code and/or natural language, wherein each of the plurality of neural transformer models with attention is associated with a standard memory size and a number of transformer blocks;
obtain a request to train a custom neural transformer model with attention from a select one of the plurality of neural transformer models with attention, wherein the request includes a custom memory size for the custom neural transformer model with attention; and
when none of the plurality of neural transformer models with attention meet the custom memory size:
select one of the plurality of neural transformer models with attention having a standard memory size larger than the custom memory size;
compute a scaling factor for the selected neural transformer model with attention to fit the custom memory size;
reduce a number of transformer blocks of the selected neural transformer model with attention based on the scaling factor to generate the custom neural transformer model with attention; and
train the custom neural transformer model with attention with a training dataset tailored for a software engineering task.

2. The system of claim 1, wherein the program includes instructions to perform actions that:
perform knowledge distillation on the selected neural transformer model with attention to form the custom neural transformer model with attention with the reduced number of transformer blocks.

3. The system of claim 1,
wherein the plurality of neural transformer models with attention comprises a first neural transformer model having only encoder transformer blocks,
wherein the first neural transformer model with attention is associated with a classification software engineering task.

4. The system of claim 3,
wherein the first neural transformer model with attention comprises an output layer,
wherein the program includes instructions to perform actions that replace the output layer of the first neural transformer model with attention with a classification layer configured for the supervised training dataset.

5. The system of claim 1, wherein the program includes instructions to perform actions that:
wherein the plurality of neural transformer models with attention comprises a second neural transformer model having only decoder transformer blocks,
wherein the second neural transformer model with attention is associated with an auto-regressive software engineering task.

6. The system of claim 1, wherein the program includes instructions to perform actions that:
wherein the plurality of neural transformer models with attention comprises a third neural transformer model with attention having encoder transformer blocks coupled to decoder transformer blocks,
wherein the third neural transformer model with attention is associated with a sequence-to-sequence software engineering task.

7. The system of claim 1, wherein the memory size is a product of a number of model parameters of a neural transformer model with attention and a number of bytes used to store a model parameter.

8. The system of claim 1, wherein the program includes instructions to perform actions that:

when at least one of the plurality of neural transformer models with attention meets the custom memory size:
fine-tune the at least one of the plurality of neural transformer models with attention with a training dataset tailored for a software engineering task to generate the custom neural transformer model with attention.

9. A computer-implemented method, comprising:
accessing a plurality of neural transformer models with attention having been trained on source code and/or natural language, wherein each of the plurality of neural transformer models with attention is associated with a standard memory size and a number of transformer blocks;
receiving a request to train a custom neural transformer model with attention from a select one of the plurality of neural transformer models with attention, wherein the request includes a custom memory size for the custom neural transformer model with attention;
when none of the plurality of neural transformer models with attention meets the custom memory size, selecting one of the plurality of neural transformer models with attention having a standard memory size larger than the custom memory size;
determining a scaling factor for the selected neural transformer model with attention to fit the custom memory size;
reducing a number of transformer blocks of the selected neural transformer model with attention based on the scaling factor to generate the custom neural transformer model with attention; and
training the custom neural transformer model with attention with a training dataset tailored for a software engineering task.

10. The computer-implemented method of claim 9, further comprising:
performing knowledge distillation on the selected neural transformer model with attention to generate the reduced number of transformer blocks of the custom neural transformer model with attention.

11. The computer-implemented method of claim 9, wherein the plurality of neural transformer models with attention comprises a first neural transformer model with attention having only encoder transformer blocks, wherein the first neural transformer model with attention is associated with a classification software engineering task.

12. The computer-implemented method of claim 9, further comprising:
replacing an output layer of the first neural transformer model with attention with a classification layer configured for the classification software engineering task.

13. The computer-implemented method of claim 9, wherein the plurality of neural transformer models with attention comprises a second neural transformer model with attention having only decoder transformer blocks, wherein the second neural transformer model with attention is associated with an auto-regressive software engineering task.

14. The computer-implemented method of claim 9, wherein the plurality of neural transformer models with attention comprises a third neural transformer model with attention having encoder-decoder transformer blocks, wherein the third neural transformer model with attention is associated with a machine translation software engineering task.

15. A hardware storage device having stored thereon computer executable instructions that are structured to be executed by a processor of a computing device to thereby cause the computing device to perform actions that:
provide a plurality of neural transformer models with attention trained on source code and/or natural language, wherein each of the plurality of neural transformer models with attention is associated with a standard memory size and a number of transformer blocks;
obtain a request to train a custom neural transformer model with attention from a select one of the plurality of neural transformer models with attention, wherein the request includes a custom memory size for the custom neural transformer model with attention; and
when none of the plurality of neural transformer models with attention meets the custom memory size:
select one of the plurality of neural transformer models with attention having a standard memory size larger than the custom memory size;
compute a scaling factor for the selected neural transformer model with attention to fit the custom memory size;
reduce a number of transformer blocks of the selected neural transformer model with attention based on the scaling factor to generate the custom neural transformer model with attention; and
train the custom neural transformer model with attention with a training dataset tailored for a software engineering task.

16. The hardware storage device of claim 15, having stored thereon computer executable instructions that are structured to be executed by a processor of a computing device to thereby cause the computing device to perform actions that:
prior to the training of the custom neural transformer model with attention with the training dataset, perform knowledge distillation on the selected neural transformer model with attention to form the custom neural transformer model with attention with the reduced number of transformer blocks.

17. The hardware storage device of claim 15, wherein the plurality of neural transformer models with attention comprises at least one encoder-only neural transformer model with attention, wherein the at least one encoder-only neural transformer model with attention is associated with a classification software engineering task.

18. The hardware storage device of claim 15, wherein the plurality of neural transformer models with attention comprises at least one decoder-only neural transformer model with attention, wherein the at least one decoder-only neural transformer model with attention is associated with an autoregressive software engineering task.

19. The hardware storage device of claim 15, wherein the plurality of neural transformer models with attention comprises at least one encoder-decoder neural transformer model with attention, wherein the at least one encoder-decoder neural transformer model with attention is associated with a machine translation software engineering task.

20. The hardware storage device of claim 15, having stored thereon computer executable instructions that are structured to be executed by a processor of a computing device to thereby cause the computing device to perform actions that:
when at least one of the plurality of neural transformer models with attention meets the custom memory size:

fine-tune the at least one of the plurality of neural transformer models with attention with a training dataset tailored for a software engineering task to generate the custom neural transformer model with attention.

* * * * *